Sept. 6, 1966  J. P. ROONEY  3,271,706
MICROWAVE FILTER

Filed Dec. 7, 1964  3 Sheets-Sheet 1

INVENTOR.
JOHN P. ROONEY
BY Samuel E. Turner
ATTORNEY

INVENTOR.
JOHN P. ROONEY
BY Samuel E. Turner

ATTORNEY

Sept. 6, 1966  J. P. ROONEY  3,271,706
MICROWAVE FILTER

Filed Dec. 7, 1964  3 Sheets-Sheet 3

INVENTOR.
JOHN P. ROONEY
BY
Samuel E. Turner
ATTORNEY

United States Patent Office 3,271,706
Patented Sept. 6, 1966

3,271,706
MICROWAVE FILTER
John P. Rooney, Palo Alto, Calif., assignor to General Electric Company, a corporation of New York
Filed Dec. 7, 1964, Ser. No. 416,246
9 Claims. (Cl. 333—73)

This invention relates to waveguide low-pass filters with wide stop-bands. More particularly the invention relates to filters of the "waffle-iron" type. More specifically the invention relates to a waffle-iron filter structure having means to suppress spurious modes such as the poorly attenuated slot modes which arise, for example, from dimensional deviations in the waffle-iron pattern and which result in narrow frequency ranges of low attenuation in the design stop-band.

The waffle-iron filter, which is derived from the wideband corrugated waveguide filter, has previously been described, for example, by Young and Schiffman in an article entitled "New and Improved Types of Waffle-Iron Filters," Proc. IEE (London), vol. 110, pp. 1191–1198, July 1963. This article, which shows a perspective view of a form of waffle-iron filter in FIG. 1 thereof, summarizes the design principles of waffle-iron filters.

In the foregoing article there is also discussed the problem of spurious responses resulting from narrow zones of poor attenuation caused by mechanical imperfections such as misalignment of the teeth of the filter and imperfect flange contacts. For example, a transverse misalignment of the teeth of the filter causes a net electric field in the transverse direction which gives rise to spurious slot modes whose propagation can be explained by considering that the opposing longitudinal slots of the waffle-iron pattern act as rectangular waveguides propagating the spurious slot modes along the filter. (If the alignment of the teeth is perfect, the electric fields at opposing edges of the teeth cancel, the net electric field is zero, and therefore the spurious slot modes do not arise.)

To eliminate such spurious responses the foregoing article proposes the addition of thin steel rods placed transversely and centrally in the transverse slots between the teeth of the waffle-iron pattern. These rods alter the resonant frequency of the slots and tend to short circuit the electric fields thus providing substantial suppression of the spurious slot modes.

However, it is found that these rods must be accurately positioned lest they increase rather than decrease the coupling to the slot modes. Thus, the accurate positioning of the rods as is necessary to suppress the spurious modes presents a construction problem comparable to the problem of accurate alignment of the teeth of the filter which would prevent the generation of the spurious modes in the first place. Furthermore, it is obvious that the addition of such rods adds to the cost of the filter structure. It is also found that the presence of these rods lowers the power handling capability of the filter.

It is the object of the present invention to provide suppression of spurious responses in a filter structure of the waffle-iron type without the requirement of close construction tolerances and without lowering the power handling capability of the filter.

This and other objects of the invention are achieved by providing a filter structure wherein the longitudinal slots are made discontinuous whereby the propagation of the spurious modes is interrupted.

In a first illustrated embodiment of the invention, the longitudinal slots are made discontinuous by forming the waffle-iron pattern in several separate sections, adjacent sections being connected by sections of decoupling waveguides which propagate the desired $TE_m0$ modes but which are cut off to the spurious slot modes.

In a second illustrated embodiment of the invention, separate sections of waffle-iron filter are coupled by sections of corrugated waveguide filter.

The invention is described more specifically hereinafter with reference to the accompanying drawings wherein.

Figure 1:
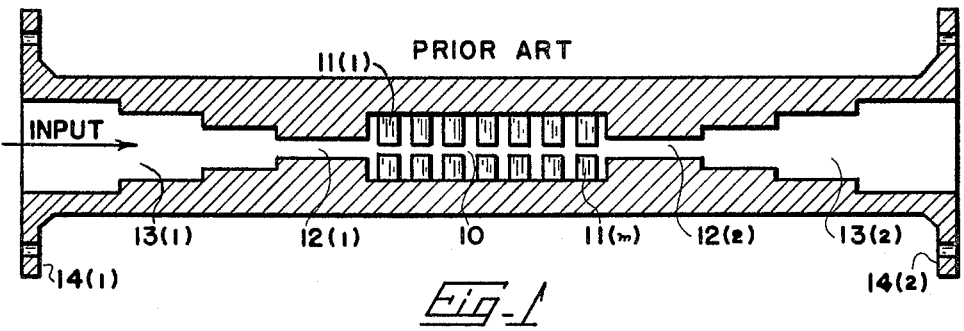
FIGURE 1 is an axial or longitudinal cross section view of a prior art waffle-iron filter together with terminating waveguides, impedance matching sections and waveguide connection flanges.

Shown in FIG. 1 is a waffle-iron filter structure including a prior art waffle-iron filter section 10 formed of spaced, opposing grids of conductive teeth 11(1)–11(m). The design principles of such waffle-iron filters are given in the previously mentioned article by Young et al.

The filter structure of FIG. 1 also includes terminating waveguides 12(1) and 12(2), stepped impedance matching transformer sections 13(1) and 13(2) and flanges 14(1) and 14(2) for connection of the filter structure in a waveguide system. The terminating waveguides 12(1) and 12(2) preferably comprise low-height rectangular waveguides which are designed for cut off of $TE_{mn}$ ($n+0$) and $TM_{mn}$ modes up to the highest stop-band frequency of the waffle-iron filter.

Figure 2:
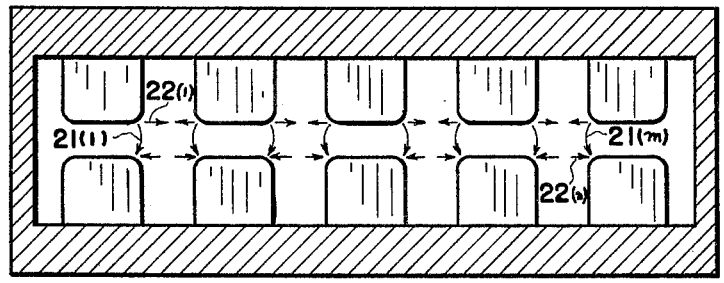
FIGURE 2 is a transverse cross section view of a waffle-iron filter having accurately aligned teeth.
Figure 3:
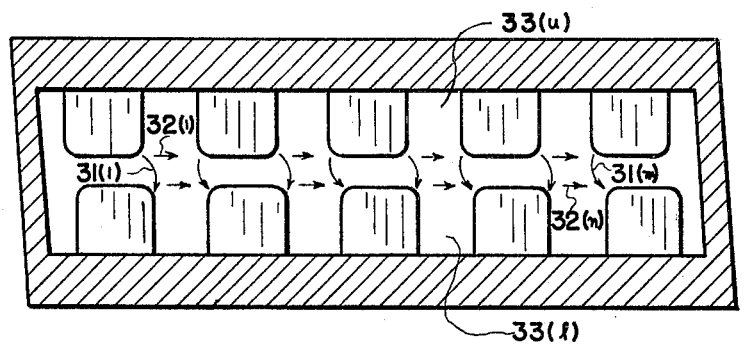
FIGURE 3 is a transverse cross section view of a waffle-iron filter having transversely misaligned teeth.

FIGS. 2 and 3 are transverse cross section views of a waffle-iron filter useful in illustrating how one form of spurious responses can arise therein.

FIG. 2 illustrates a waffle-iron filter with its teeth in accurate transverse alignment. A plurality of curved arrows 21(1)–21(m) illustrate the resulting electric fields between the corners and edges of opposing teeth due to an incident $TE_{10}$ wave. It is noted that these electric fields thus have components in both the transverse and longitudinal directions. In FIG. 2 the transverse components of these fields are illustrated by short transverse arrows 22(1)–22(n). It is further noted that with accurately aligned teeth, such as in FIG. 2, the transverse components of the electric fields 21(1)–21(m) cancel and no net transverse electric field results. Therefore, with accurately aligned teeth, no coupling to the slot modes occurs.

In contrast, FIG. 3 illustrates a waffle-iron filter structure with transversely misaligned teeth (the misalignment being exaggerated for purposes of illustration). A plurality of curved arrows 31(1)–31(m) represent the electric field between corner and axial edges of the misaligned teeth due to an incident $TE_{10}$ wave. These electric fields result in net transverse electric fields directed toward the right as illustrated by a plurality of short transverse arrows 32(1)–32(n). These net transverse electric fields give rise to spurious slot modes which propagate through the filter along the virtual longitudinal rectangular waveguides formed by the opposing axial slots between the rows of teeth of the filter pattern such as a pair of opposing slots 33(u) and 33(l). Thus, while a terminating input waveguide section of reduced height (such as the reduced-height waveguide section 12(1) of FIG. 1) can prevent such spurious modes from reaching the waffle-iron filter, it is seen that such modes can arise within the filter if it is not accurately constructed and aligned.

Such spurious modes are suppressed by the structure of the present invention without lowering the power handling capability of the filter, without increasing the cost of the filter and without the requirement of very close tolerances.

Figure 4A:
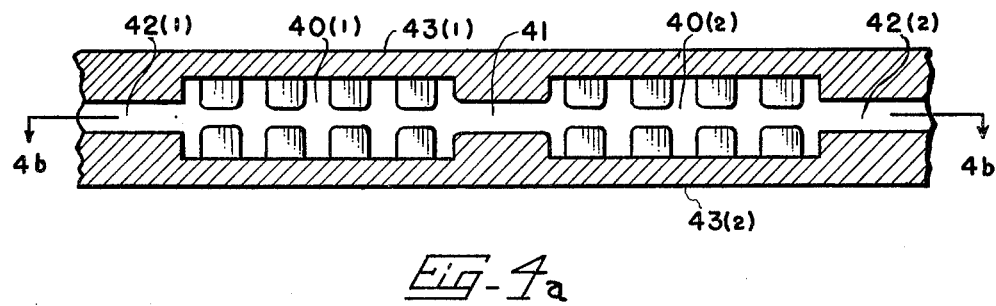
FIGURE 4a is an axial or longitudinal cross section elevational view of a filter structure according to a first embodiment of the invention.
Figure 4B:
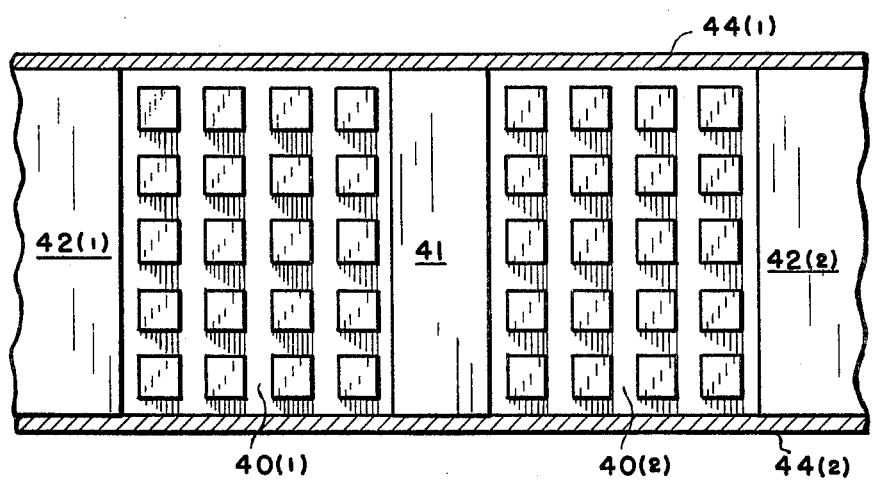
FIGURE 4b is a cross-sectional plan view of the filter structure of FIG. 4a taken along the line 4b—4b and showing the lower half of the filter pattern.

A first embodiment of a filter structure according to the invention is illustrated in FIGS. 4a and 4b, FIG. 4a being a longitudinal cross section view and FIG. 4b being a longitudinal cross-sectional plan view of the structure. In accordance with the principles of the present invention, the longitudinal slots of the waffle-iron pattern are made discontinuous by forming the filter of a plurality of separated waffle-iron filter sections, the separated waffle-iron sections being connected by a wave transmission structure having the property of suppressing the spurious modes while providing transmission of the desired electromagnetic wave.

Thus, as illustrated in FIGS. 4a and 4b, a first embodiment of the invention is formed of a pair of waffle-iron filter sections 40(1) and 40(2) joined by a section of low-height rectangular waveguide 41 which serves as a decoupling section to make the longitudinal slots of the waffle-iron pattern discontinuous and thereby prevent transmission of spurious modes through the filter. In other words, any electromagnetic waves for which the decoupling section 41 is cut off will be suppressed. The low-height waveguide decoupling section 41 is designed, in well-known manner, to be cut off to the spurious modes and to match the impedance of the adjacent waffle-iron sections.

The longitudinal length of the decoupling section 41 should be sufficient to prevent direct coupling of the spurious slot modes from one waffle-iron section to the other. The impedance of the decoupling section 41 can be made different from that of the waffle-iron filter sections, in which case the length of the decoupling section can be made an integral number of half-wavelengths long at the desired pass-band center frequency to provide an impedance match.

As illustated in FIGS. 4a and 4b, the filter structure is provided with reduced-height terminating waveguides including an input waveguide 42(1) and an output waveguide 42(2). Impedance matching transformer sections and connecting flanges are not shown in FIGS. 4a and 4b as such structure may be similar to that shown in FIG. 1.

The waffle-iron teeth and waveguide surfaces are supported in a chamber formed by a conductive upper chamber member 43(1) and a conductive lower chamber member 43(2), members 43(1) and 43(2) being joined by conductive side members 44(1) and 44(2).

Figure 5A:
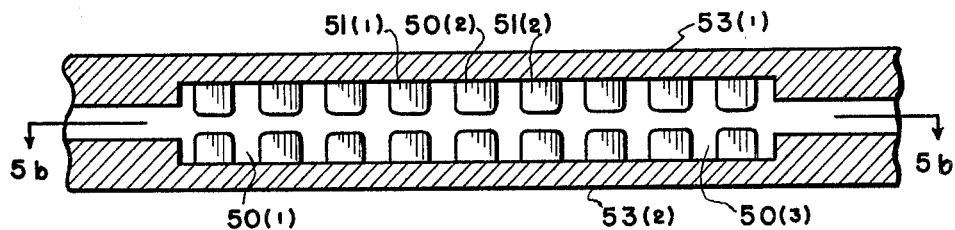
FIGURE 5a is a longitudinal cross section elevational view of a second embodiment of the invention.
Figure 5B:
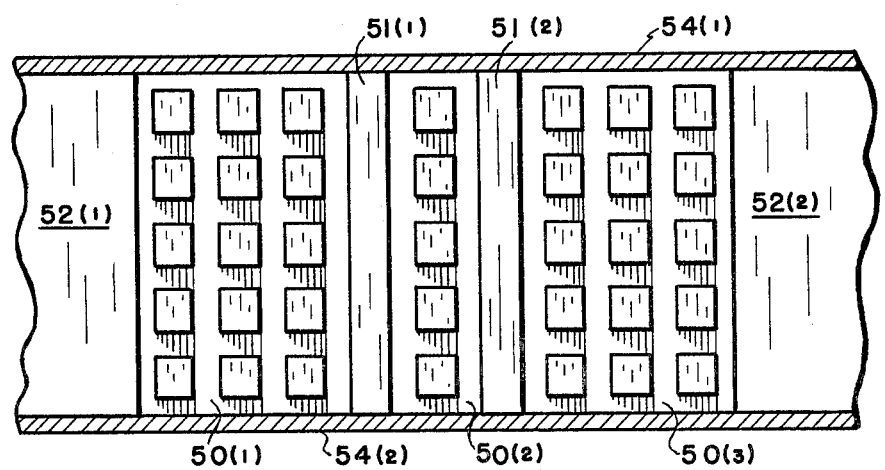
FIGURE 5b is a cross-sectional plan view of the filter structure of FIG. 5a taken along the line 5b—5b.

A second embodiment of a filter structure according to the invention is shown in FIGS. 5a and 5b, FIG. 5a being a longitudinal cross section view and FIG. 5b being a longitudinal cross-sectional plan view of the structure. The filter structure of FIGS. 5a and 5b is formed of a plurality of waffle-iron filter sections 50(1), 50(2) and 50(3) which are joined by a pair of decoupling corrugated waveguide sections 51(1) and 51(2) best seen in FIG. 5b. Thus, in this embodiment, the longitudinal slots of the waffle-iron pattern are made discontinuous by the transverse conductive ridges forming the corrugated filter sections 51(1) and 51(2).

While three sections of waffle-iron filter and two sections of decoupling corrugated waveguide are illustrated in FIGS. 5a and 5b, in a given application two sections of waffle-iron filter connected by a single decoupling corrugated waveguide may be sufficient. Also decoupling corrugated waveguide sections having more than one corrugation may be used. Similarly, the number of teeth and the number of rows of teeth of the illustrated waffle-iron filter sections are not a limitation.

As mentioned hereinbefore, the design principles of the waffle-iron filter sections are presented in the previously mentioned Young et al. publication and in the embodiment of FIGS. 5a and 5b the corrugated decoupling sections 51(1) and 51(2) may have the dimensions of the corrugated waveguide filter prototype from which the associated waffle-iron filter sections are designed.

The impedance of a corrugated waveguide section is generally different from the impedance of a correspondingly derived waffle-iron filter because of the absence of the longitudinal slots. To compensate for this difference, the spacing between opposing corrugations can be slightly increased or a greater radius of the opposing edges of the corrugations can be employed.

As illustrated in FIGS. 5a and 5b the filter structure includes a pair of low-height terminating waveguides 52(1) and 52(2) and the filter structure is supported in a conductive chamber formed of an upper member 53(1), a lower member 53(2) and a pair of side members 54(1) and 54(2).

Thus, what has been described is a microwave filter structure formed of a plurality of waffle-iron filter sections which are joined by wave transmission sections that are designed to pass the desired waves but which suppress the spurious responses of the waffle-iron sections.

While the principles of the invention have been made clear in the illustrative embodiments, there will be obvious to those skilled in the art many modifications in structure, arrangement, proportions, the elements, materials and components used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A microwave filter system comprising: a plurality of waffle-iron filter sections for preventing passage of predetermined electromagnetic waves, said filter sections having the characteristic of giving rise to spurious responses; and means for suppressing said spurious responses comprising electromagnetic wave transmission means connecting said filter sections, said means being designed to prevent transmission of said spurious responses.

2. The filter system of claim 1 wherein said wave transmission means is formed of a length of reduced-height waveguide.

3. The filter system of claim 1 wherein said wave transmission means is formed of a corrugated waveguide filter section.

4. A microwave filter structure for passing predetermined electromagnetic waves and for stopping other waves, comprising: a plurality of waffle-iron filter sections each designed to pass said predetermined electromagnetic waves; a decoupling section interconnecting each adjacent pair of said waffle-iron filter sections, said decoupling sections being designed to transmit said predetermined electromagnetic waves between said waffle-iron filter sections and being designed to cut off predetermined other electromagnetic waves; means for applying electromagnetic waves to be filtered to said structure; and means for transmitting filtered waves from said structure.

5. The filter structure of claim 4 wherein said decoupling section is formed of a length of reduced-height waveguide.

6. The filter structure of claim 4 wherein said decoupling section is formed of a corrugated waveguide filter section.

7. A microwave filter, comprising: a waffle-iron filter structure including a pair of spaced conductive members formed with opposing grids of upstanding conductive portions for transmitting electromagnetic waves along a longitudinal path therebetween, said portions forming spaced transverse and longitudinal slots; and means for rendering said longitudinal slots discontinuous at at least one portion of said longitudinal path.

8. A microwave filter according to claim 7 wherein said means for rendering said longitudinal slots discontinuous comprises at least one section of reduced-height waveguide.

9. A microwave filter according to claim 7 wherein said means for rendering said longitudinal slots discontinuous comprises at least one corrugated wavegiude filter section, each said corrugated waveguide filter section including at least one pair of opposed transverse corrugations.

References Cited by the Examiner

UNITED STATES PATENTS

| 3,046,503 | 7/1962 | Cohn | 333—73 |
| 3,088,082 | 4/1963 | Petrilla et al. | 333—98 |
| 3,153,767 | 10/1964 | Kyhl | 333—98 |

FOREIGN PATENTS 529,539  6/1938  Great Britain.

HERMAN KARL SAALBACH, *Primary Examiner.*

L. ALLAHUT, *Assistant Examiner.*